United States Patent
Inoue et al.

(10) Patent No.: US 8,306,315 B2
(45) Date of Patent: Nov. 6, 2012

(54) METHOD OF COMPILING THREE-DIMENSIONAL OBJECT IDENTIFYING IMAGE DATABASE, PROCESSING APPARATUS AND PROCESSING PROGRAM

(75) Inventors: Katsufumi Inoue, Sakai (JP); Hiroshi Miyake, Sakai (JP); Koichi Kise, Sakai (JP)

(73) Assignee: Osaka Prefecture University Public Corporation, Osaka (JP)

( * ) Notice: Subject to any disclaimer, the term of this patent is extended or adjusted under 35 U.S.C. 154(b) by 25 days.

(21) Appl. No.: 12/990,401

(22) PCT Filed: Apr. 27, 2009

(86) PCT No.: PCT/JP2009/058284
§ 371 (c)(1),
(2), (4) Date: Nov. 22, 2010

(87) PCT Pub. No.: WO2009/133855
PCT Pub. Date: Nov. 5, 2009

(65) Prior Publication Data
US 2011/0058733 A1    Mar. 10, 2011

(30) Foreign Application Priority Data

Apr. 30, 2008  (JP) ................................. 2008-118646

(51) Int. Cl.
*G06K 9/00* (2006.01)
*G06F 3/048* (2006.01)
(52) U.S. Cl. ........................ 382/154; 715/852
(58) Field of Classification Search .................. 382/100, 382/154, 285; 700/98, 118, 163; 702/152, 702/153; 715/757, 782, 836, 848, 852, 976
See application file for complete search history.

(56) References Cited

U.S. PATENT DOCUMENTS

| | | | | |
|---|---|---|---|---|
| 7,421,149 | B2 * | 9/2008 | Haynes et al. | 382/291 |
| 7,463,184 | B2 * | 12/2008 | Segawa | 342/52 |
| 2005/0201595 | A1 | 9/2005 | Kamei | |

FOREIGN PATENT DOCUMENTS

| KR | 10-0578614 B1 | 1/2005 |
|---|---|---|
| WO | WO 2004/008391 A1 | 1/2004 |
| WO | WO 2008/026414 A1 | 3/2008 |

OTHER PUBLICATIONS

International Search Report dated Jun. 23, 2009 in International Application No. PCT/JP2009/058284.

(Continued)

*Primary Examiner* — Abolfazl Tabatabai
(74) *Attorney, Agent, or Firm* — Birch, Stewart, Kolasch & Birch, LLP

(57) ABSTRACT

Provided are a method of generating a low-capacity model capable of identifying an object with high accuracy, and creating an image database using the model, a processing program for executing the method, and a processing apparatus that executes the process. The method for compiling an image database that is used for a three-dimensional object recognition includes a step of extracting vectors as local descriptors from a plurality of images each image showing a three-dimensional object as seen from different viewpoints, a model creating step of evaluating the degree of contribution of each local descriptor to identification of the three-dimensional object, and creating a three-dimensional object model systematized to ensure approximate nearest neighbor search using the individual vectors which satisfy criteria, and a registration step of adding an object identifier to the created object model and registering the object model into an image database.

11 Claims, 8 Drawing Sheets

| OBJECT NAME | DOLL 1 | DOLL 2 | DOLL 3 | DOLL 4 | DOLL 5 | DOLL 6 | DIGITAL CAMERA | STAPLER | MOUSE | CUP | WRIST WATCH |
|---|---|---|---|---|---|---|---|---|---|---|---|
| OBJECT | | | | | | | | | | | |
| NUMBER OF IMAGES [SHEETS] | 1166 | 1254 | 1191 | 1174 | 1157 | 1151 | 1189 | 1222 | 1184 | 1210 | 1188 |
| AVERAGE NUMBER OF EXTRACTION [PIECES] | 242 | 205 | 144 | 141 | 332 | 261 | 145 | 168 | 64 | 206 | 224 |

METHOD OF COMPILING THREE-DIMENSIONAL OBJECT IDENTIFYING IMAGE DATABASE, PROCESSING APPARATUS AND PROCESSING PROGRAM

TECHNICAL FIELD

The present invention relates to a method of compiling three-dimensional object identifying image database, a processing apparatus and a processing program. More particularly, the present invention relates to: a method for compiling an image database which stores therein a plurality of images showing three-dimensional objects from viewpoints for constructing models of the respective objects and from which a model corresponding to an object that is given as a retrieval query (query) is retrieved so as to output an object relating to the model as a recognition result; and an apparatus and a program for processing the image database.

BACKGROUND ART

In recent years, as digital cameras are increasingly widespread and sophisticated, the digital cameras and devices using them are increasingly receiving attention as new information devices. In addition, the increase in the memory capacity of hard disks allows individual people to possess a large amount of image data. Accordingly, researches dealing with a large number of digital images or moving images are conducted actively. As a field of such researches, there is research on recognition of three-dimensional objects included in images.

The techniques of recognizing three-dimensional objects included in images can be classified into a technique that generally recognizes the class of objects and a technique that recognizes the instance. The former returns the class of objects, such as a chair and an automobile, as the result, whereas the latter identifies the instance such as a specific model of an automobile. The present invention will focus on the latter, i.e., the identification of the instance, and description will be made in relation thereto. Particularly, the present invention will focus on a three-dimensional object recognition, which uses local descriptors, for example based on a SIFT (Scale-Invariant Feature Transform)(e.g., see Non-Patent Literature 1). In the conventional techniques, there is a technique which constructs a three-dimensional surface model of an object through matching of local descriptors, based on images of an object shot from various angles, so as to be used for recognition (e.g., see Non-Patent Literatures 2 and 3). In addition, there is a technique that uses local descriptors extracted from an image for construction of a model to be matched with unknown images, without using a three-dimensional model (e.g., see Non-Patent Literatures 4 and 5). The present invention relates to the latter approach.

As a simplest technique using such an approach, there is a technique in which a large number of local descriptors are extracted from images of an object shot under various conditions, and are stored for constructing a model. Advantageously, this simple approach can easily realize highly accurate recognition. However, since a huge number of the local descriptors will be obtained, there are problems in that it takes immense time to perform local descriptor matching, and in that it is difficult to perform a large-scale object recognition since a large memory is required for recognition.

As to the former problem, it is indispensable to improve the efficiency in the nearest neighbor searching of local descriptors. Thus, in order to solve this problem, there is a technique using approximate nearest neighbor searching of local descriptors. According to Noguchi et al., it is reported that with introduction of this technique into the object recognition, it is possible to realize a high-speed, highly accurate object recognition. (e.g., see Non-Patent Literature 6, and Patent Literature 1).

On the other hand, as to the latter problem, since the memory size of models (memory required for models) constitutes a large proportion of the memory required for recognition, reduction in the memory size of models is a main problem.

Meanwhile, of the three-dimensional object recognition techniques using local descriptors, such techniques that do not construct three-dimensional models of objects are advantageous, since with shot images of an object, it is possible to simply construct its model by extracting local descriptors therefrom. In order to achieve accuracy in the three-dimensional object recognition using such simple techniques, a large number of images shot under various conditions are required for constructing a model. Generally, since several dozen to several thousand local descriptors are extracted from one image, an extremely large number of local descriptors will be involved in modeling of an object, and how to deal with such local descriptors will be the main subject.

Most of the conventional techniques employ a method of vector-quantization of local descriptors so as to be replaced by representation vectors, which are called visual words. In the case of recognizing an unknown image, local descriptors obtained from the image are replaced by the visual words so as to be matched. In the case of identification of the instance of an object, it is known that, particularly, the more the number of the visual words is increased, the more the recognition rate will be improved, although the improvement depends on the recognition target. For example, Nister et al. reported an example using 16 million visual words (see Non-Patent Literature 4). In the case of using a large number of visual words, the calculation time required for matching between the local descriptors and the visual words is unignorable, and thus speeding-up by using various data structures such as a tree structure is necessary (see Non-Patent Literatures 4 and 5).

Among the techniques using such a large number of visual words, a technique of using all "cases" of the local descriptors without using vector quantization is the most extreme one. With this approach, although high recognition rate can be expected, a problem will occur in that a huge memory will be required for model recording.

The simplest one of the recognition techniques may be such a technique in which a label indicating an object is added to a large number of local descriptors, which correspond to the above cases, and based on matching with those local descriptors which are obtained from unknown images, votes are cast for the label indicating the object. Normally, the matching is performed using the nearest neighbor searching. In such a process, since it is only necessary to assign a correct label to each local descriptor obtained from unknown images, it is not necessary to record all the local descriptors. Here, "voting" is processing used for partially counting up evidences in the field of information processing, and is processing in which: based on each of the obtained evidences, a score is given to one of choices; and the choice that has obtained a top score, as a result of counting up scores based on all the evidences, is to be selected. Generally, the score for voting varies depending on the evidences.

As a method of eliminating unnecessary local descriptors while guaranteeing the same effect as that in the case of recording all the local descriptors, a method called condensing is proposed. For example, Wada et al. proposed a technique that is also efficiently applicable to a higher-dimensional space (e.g., see Non-Patent Literature 7).

CITATION LIST

Patent Literature

Patent Literature 1: International Publication No. 2008/026414

Non-Patent Literature

Non-Patent Literature 1: D. Lowe: "Distinctive Image Features from Scale-Invariant Keypoints", International Journal of Computer Vision, Vol. 60, No. 2, pp. 91-110 (2004)
Non-Patent Literature 2: F. Rothganger, S. Lazebnik, C. Schmid and J. Ponce: "3D Object Modeling and Recognition from Photographs and Image Sequences", Ponce et al., Eds., Toward Category-Level Object Recognition, LNCS4170, Springer, pp. 105-126 (2006)
Non-Patent Literature 3: D. Lowe: "Local Feature View Clustering for 3D Object Recognition", Proc. CVPR2001, Springer, pp. 682-688 (2001)
Non-Patent Literature 4: D. Nister and H. Stewenius: "Scalable Recognition with a Vocabulary Tree", Proc. CVPR2006, pp. 775-781 (2006)
Non-Patent Literature 5: S. Obdrzalek and J. Matas: "Sublinear Indexing for Large Scale Object Recognition", British Machine Vision Conference (BMVC), pp. 1-10 (2005)
Non-Patent Literature 6: Kazuto Noguchi, Kouichi Kise, Masakazu Iwamura: "Efficient Recognition of Objects by Cascading Approximate Nearest Neighbor Searchers" Meeting on Image Recognition and Understanding (MIRU2007) Collection of papers, OS-B2-02, pp. 111-118 (2007)
Non-Patent Literature 7: Takekazu Kato, To shikazu Wada: "Algorithms and Evaluations for Efficient Condensing based on Proximity Graphs" Shingaku Giho PRMU, Vol. 103, No. 96, pp. 19-24 (2003)

SUMMARY OF THE INVENTION

Problems to be Solved by the Invention

According to the technique (see Non-Patent Literature 6) of the approximate nearest neighbor searching proposed by Noguchi et al., for example, objects are recognized by majority vote. In view of this, it is understood that all the votes need not necessarily be correct. In the case of a 2D planar object, it is known that the matching accuracy required for achieving recognition rate of 97% or more is as low as about 15% (see Non-Patent Literature 6). Based on this point, it may be possible to construct an object model with an even lesser number of local descriptors than those obtained through condensing.

In other words, as a technique of reducing the memory size of models, a technique of choosing local descriptors to be stored in models thereby to reduce the memory size of the models can be considered. In this case, it is necessary to reduce the number of local descriptors to be stored in the models while maintaining the object recognition rate.

Namely, when all the local descriptors are stored in the models, it is possible to recognize three-dimensional objects highly accurately. However, due to a huge number of local descriptors, a huge memory size is required for the models.

Solution to the Problems

The present invention is, based on the above viewpoint, to choose local descriptors that are less likely to lower the recognition rate, and thereby to construct small memory models which enable highly accurate object recognition. In addition, the present invention provides a method for compiling an image database using the models, and an apparatus and a program for processing the image database.

The present invention provides a method for compiling an image database that is used for a three-dimensional object recognition comprising the steps of: extracting, from a plurality of images each image showing a three-dimensional object from different viewpoint, a plurality of local descriptors each of which is a vector representing respective local features of each image; constructing an object model of the three-dimensional object, the object model being obtained by estimating contribution of each vector to the three-dimensional object recognition, by choosing the vectors making positive contribution and by organizing the chosen vectors in such a manner that each vector is adapted to be used for approximate nearest neighbor searching; and storing into the image database the images showing the three-dimensional object and the constructed object model with an object ID for identifying the three-dimensional object being attached, wherein: each of the steps is executed by a computer; the storing step stores the object model and the corresponding object ID so that, when an image showing a three-dimensional object in question is given as a query while a plurality of object models are stored in the image database, the computer extracts a plurality of query local descriptors from the query through a similar step to the extracting step, retrieves vectors as neighbor vectors of each query local descriptor, each neighbor vector being retrieved from the stored object models in the image database by using an algorithm of the approximate nearest neighbor searching, obtains object IDs attached to the neighbor vectors, determines at least one three-dimensional object which is identified by the object IDs as a candidate and determines at least one three-dimensional object based on points of similarities and/or of differences between each query local descriptor and corresponding neighbor vector; and the object model construction step estimates the contribution of each vector in such a manner that when a vector extracted from an image of a three-dimensional object is approximately nearest to another vector according to the same three-dimensional object from a different viewpoint, the vector is regarded to make a positive contribution, and when the vector is approximately nearest to another vector according to a different three-dimensional object, the vector is regarded to make a negative contribution.

In another aspect, the present invention provides an apparatus for processing an image database that is used for a three-dimensional object recognition comprising: an extraction section which extracts, from a plurality of images each image showing a three-dimensional object from different viewpoint, a plurality of local descriptors each of which is a vector representing respective local features of each image; a model construction section which constructs an object model of the three-dimensional object, the object model being obtained by estimating contribution of each vector to the three-dimensional object recognition, by choosing the vectors making positive contribution and by organizing the chosen vectors in such a manner that each vector is adapted to be used for approximate nearest neighbor searching; a storing section which stores into the image database the images showing the three-dimensional object and the constructed object model with an object ID for identifying the three-dimensional object being attached; and a retrieval section which, when an image showing a three-dimensional object in question is given as a query while a plurality of object models are stored in the image database: extracts a plurality of query local descriptors from the query in a similar manner as in the extraction section; retrieves vectors as neighbor vectors of each query local descriptor, each neighbor vector being retrieved from the stored object models in the image database by using an algorithm of the approximate nearest neighbor searching; obtains object IDs attached to the neighbor vectors; determines at least one three-dimensional object which is identified by the object IDs as a candidate; and determines at least one three-dimensional object based on points of similarities and/or of differences between each query local descriptor and corresponding neighbor vector, wherein the object model construction section estimates the contribution of each vector in such a manner that when a vector extracted from an image of a three-dimensional object is approximately nearest to another vector according to the same three-dimensional object from a different viewpoint, the vector is regarded to make a positive contribution, and when the vector is approximately nearest to another vector according to a different three-dimensional object, the vector is regarded to make a negative contribution.

In still another aspect, the present invention provides a program for processing an image database that is used for a three-dimensional object recognition, the program causing a computer to function as: an extraction section which extracts, from a plurality of images each image showing a three-dimensional object from different viewpoint, a plurality of local descriptors each of which is a vector representing respective local features of each image; a model construction section which constructs an object model of the three-dimensional object, the object model being obtained by estimating contribution of each vector to the three-dimensional object recognition, by choosing the vectors making positive contribution and by organizing the chosen vectors in such a manner that each vector is adapted to be used for approximate nearest neighbor searching; a storing section which stores into the image database the images showing the three-dimensional object and the constructed object model with an object ID for identifying the three-dimensional object being attached; and a retrieval section which, when an image showing a three-dimensional object in question is given as a query while a plurality of object models are stored in the image database: extracts a plurality of query local descriptors from the query in a similar manner as in the extraction section, retrieves vectors as neighbor vectors of each query local descriptor, each neighbor vector being retrieved from the stored object models in the image database by using an algorithm of the approximate nearest neighbor searching; obtains object IDs attached to the neighbor vectors; determines at least one three-dimensional object which is identified by the object IDs as a candidate; and determines at least one three-dimensional object based on points of similarities and/or of differences between each query local descriptor and corresponding neighbor vector, wherein the object model construction step estimates the contribution of each vector in such a manner that when a vector extracted from an image of a three-dimensional object is approximately nearest to another vector according to the same three-dimensional object from a different viewpoint, the vector is regarded to make a positive contribution, and when the vector is approximately nearest to another vector according to a different three-dimensional object, the vector is regarded to make a negative contribution.

An aspect of the feature of the present invention is that through an object recognition simulation using a huge number of images, the degree of contribution (positive contribution) and the degree of obstruction (negative contribution) to the object recognition caused by the local descriptors are obtained thereby to choose local descriptors.

Effects of the Invention

In the method for compiling an image database used for a three-dimensional object recognition according to the present invention, the above model construction step estimates the contribution of vectors in such a manner that when each vector extracted from an image of a three-dimensional object is approximately nearest to another vector according to the same three-dimensional object from a different viewpoint, the vector is regarded to make a positive contribution, and when the vector is approximately nearest to another vector according to a different three-dimensional object, the vector is regarded to make a negative contribution, and then chooses the local descriptors to be used for models. Accordingly, such local descriptors that are less likely to lower the recognition rate are chosen, and thus it is possible to construct small memory models which can realize highly accurate object recognition.

In the present invention, the local descriptors represent local features of images by vectors. A specific mode for local descriptors is, for example, the SIFT. In the embodiment described later, the PCA-SIFT is applied as an example of modes for local descriptors.

Further, to contribute to recognition of an object means that a local descriptor contributes to improvement in the recognition rate. Of the local descriptors, there are local descriptors that can make a positive contribution to recognition of an object in many images among a plurality of images showing the object to be recognized. It is considered that if such local descriptors are stored in models, a fewer number of local descriptors are required for recognition of a certain number of images. Such local descriptors are considered to be effective local descriptors for constructing object models, and are given high evaluations.

Still further, to organize local descriptors so as to be adapted to be used for approximate nearest neighbor searching means to extract local descriptors from images of an object to be stored in an image database so as to store in the database the local descriptors and the above object while the both are associated with each other. The nearest neighbor searching is a process of determining, when a local descriptor is given, a local descriptor nearest to the given local descriptor from among local descriptors stored in the above database. As an example of techniques which evaluate whether or not local descriptors are nearest neighbors, the distances between respective two vectors are calculated, and the vectors at the shortest distance are regarded as nearest neighbors. Here, as to local descriptors which are determined through the above nearest neighbor searching, a local descriptor obtained from the search result need not necessarily be nearest to its corresponding query local descriptor, but needs to be near (similar) to the query local descriptor. For example, in the embodiment to be described later, approximate nearest neighbor searching (which finds nearest neighbors through approximation processing but does not guarantee they are true nearest neighbors) is employed as the nearest neighbor searching. Here, the reason why the approximate nearest neighbor searching is employed instead of the nearest neighbor searching is mainly for the sake of shortening processing time required for searching.

Further, to obtain one object from candidates, based on the points of similarities or the points of differences between each query local descriptor and candidate local descriptors means to determine one object that is most similar to the query local descriptor by estimating, using a predetermined technique, points of similarity or points of differences between the query local descriptor and the candidate local descriptors. As a specific example, there is a technique in which nearest local descriptors to query local descriptors are retrieved from among local descriptors stored in models, and a vote is cast for an object according to each of the nearest local descriptors obtained as retrieve results, and an object having obtained the largest number of votes is determined as the object most similar to the query object.

Hereinafter, preferred modes of the present invention will be described.

Further, the model construction step may specify an approximate nearest vector to a target vector to be estimated, the approximate nearest vector being retrieved from vectors extracted from images showing from the different viewpoints the same three-dimensional object according to the target vector and from images of different three-dimensional objects; count up a score in the case where the approximate nearest vector is derived from the same three-dimensional object according to the target vector; and choose the vectors that construct the object model based on scores counted in the counting steps for each vector. Accordingly, when images are provided showing, from a plurality of viewpoints, an object to be stored in an image database, each local descriptor extracted from an image showing an object from a viewpoint is estimated, whereby whether or not the local descriptor is used in the model of the object can be chosen.

Alternatively, the above model construction step may retrieve and specify a vector that is approximately nearest to a target vector to be estimated, from images showing from different viewpoints the same three-dimensional object according to the above target vector and from images of different three-dimensional objects, count up a score in the case where the approximate nearest vector is derived from the same three-dimensional object according to the target vector, deduct a score in the case where the approximate nearest vector is derived from images of different three-dimensional objects, and choose vectors that construct the above object model, based on the calculated score.

Further, the above model construction step may score each vector extracted from each image showing the three-dimensional object to be stored from the different viewpoints. Accordingly, local descriptors extracted from the images showing respective objects from respective viewpoints are estimated, whereby local descriptors that are used for constructing a model of each object can be determined.

Still further, the above model construction step may choose the vectors so that the vectors extracted from the images of the same three-dimensional object from different viewpoints are shared almost evenly in the object model. Accordingly, models almost evenly include local descriptors obtained from the respective viewpoints, and thus whatever the viewpoint of an image given as a query is, a stable nearest neighbor searching result can be obtained, and a high recognition rate can be realized.

The above model construction step may estimate the contribution of each vector to the recognition of a three-dimensional instance. In the case of recognition of the instance of an object as well as recognition of the class of an object, highly accurate, high-speed, memory efficient technique may be preferred. Since the visual words substantially involve grouping, the visual words will be effective for the recognition in the class level, but are not compatible with the recognition in the instance level. The technique of the present invention is considered to be particularly effective for the recognition in the instance level. However, this should not be deemed to exclude the employment of the technique of the present invention into the recognition in the class level, and into the technique using the visual words.

The various preferred modes described herein may be also realized by combining any of these modes.

BEST MODE FOR CARRYING OUT THE INVENTION

Hereinafter, the present invention will be described in more detail with reference to the drawings. It is noted that the description below is merely an example in all aspects, and should not be deemed to limit the present invention.

EMBODIMENT

1. Outline

Figure 1:
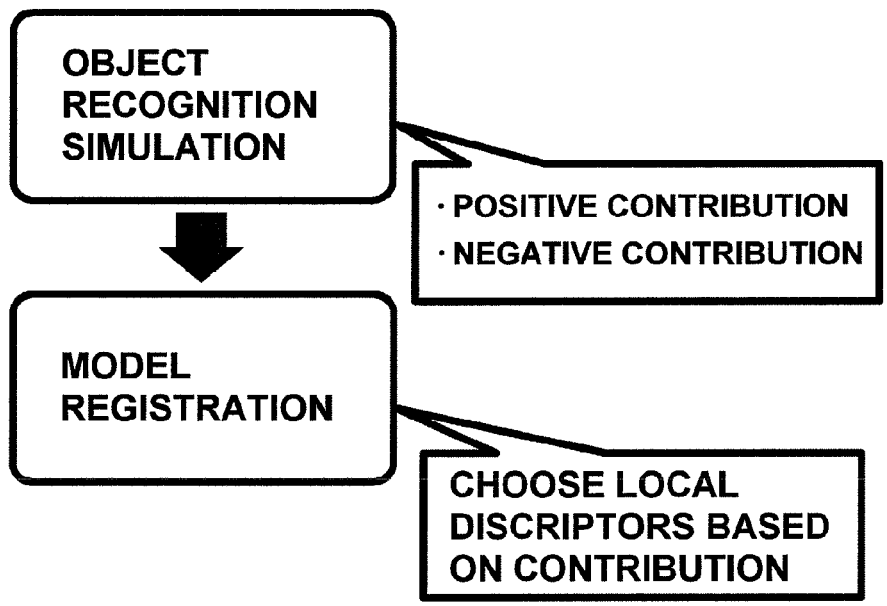
FIG. 1 is an explanatory diagram illustrating a flow of model storing processing according to the present invention.

FIG. 1 is a diagram illustrating a flow of model storing processing according to the present invention. Local descriptors include such local descriptors that improve the recognition rate of object recognition when they are stored in models, and such local descriptors that lower the recognition rate. In the present invention, in order to analyze how the local descriptors change the recognition rate, an object recognition simulation will be performed using images for model construction. In the object recognition simulation of the present invention, if local descriptors contribute to the object recognition in a manner as to improve the recognition rate, such a contribution is called "positive contribution", whereas if local descriptors contribute to the object recognition in a manner as to lower the recognition rate, such a contribution is called "negative contribution".

Some local descriptors positively contribute to recognition of many images. It is considered that if such local descriptors are stored in models, a fewer number of local descriptors are required for recognition of a certain number of images. Thus, in the present invention, such local descriptors are considered to be effective local descriptors to achieve the objective of constructing small memory models that realize highly accurate object recognition. At this time, some of such local descriptors may negatively contribute to recognition of some images. Local descriptors making negative contributions are such local descriptors that have caused error correspondence in the object recognition simulation. Thus, when such local descriptors are stored, it is considered that such local descriptors are highly likely to negatively contribute to recognition of unknown images. Accordingly, in the present invention, it will be assumed that those local descriptors which negatively contribute to a fewer images are less likely to cause erroneous voting and are more effective local descriptors.

In view of the above idea, in the present invention, the contribution of local descriptors and their characteristics are analyzed based on the result of the object recognition simulation; as many local descriptors making negative contributions as possible are eliminated; and combinations of effective local descriptors making positive contributions are searched for, for the sake of the objective achievement. However, since this combination searching involves a large-scale combination optimization problem, it is difficult to obtain optimal solutions. Thus, the present invention will propose a greedy storage technique (that may not be optimal solutions but may achieve the objective) of storing in models local descriptors that are effective for the objective achievement.

In the present invention, images that are obtained by shooting a recognition target object while the object is being rotated are referred to as frame images, and are used as model construction images. In addition, in the present invention, a PCA-SIFT is used as a technique of extracting local descriptors. The PCA-SIFT is disclosed, for example, in "PCA-SIFT: A more distinctive representation for local image descriptors" by Y. Ke and R. Sukthankar, Proc. of CVPR2004, Vol. 2, pp. 506-513 (2004). Hereinafter, processes performed to construct a model will be described specifically.

2. Object Recognition Simulation

In the present invention, an object recognition simulation is performed using the frame images, correspondence between respective query local descriptors and local descriptors in other images is checked, and how the correspondence contributes to the object recognition rate will be analyzed. In this section, description will be made on the object recognition simulation.

In this embodiment, the technique by Noguchi et al. (see Non-Patent Literature 6, and Patent Literature 1) will be used for the object recognition simulation. In this technique, for the sake of approximate nearest searching of local descriptors, models are constructed, and data is stored in hash tables. Next, local descriptors are obtained from unknown images, and by using each local descriptor as a query, its corresponding local descriptor is searched for from the hash tables through the approximate nearest searching. A vote is cast for an object including such a corresponding local descriptor. This process is performed with respect to all the local descriptors obtained from the unknown images, and an object having obtained a largest number of votes is regarded as a recognition result. In the object recognition simulation, local descriptors obtained from a frame image are used as queries, and the other local descriptors obtained from the remaining frame images are stored in models.

In this case, when a local descriptor that is nearest to a query local descriptor is obtained from the same object as the query local descriptor is, the local descriptor allows correct voting for the query, and thus contributes to the object recognition in a manner as to improve the recognition rate. Accordingly, in this embodiment, such a local descriptor is set as a local descriptor making a positive contribution. On the other hand, when a local descriptor that is nearest to a query local descriptor is obtained from an object different from that the query local descriptor is obtained from, the local descriptor contributes to the object recognition in a manner as to lower the recognition rate. Accordingly, in this embodiment, such a local descriptor is set as a local descriptor making a negative contribution. In the object recognition simulation, the above process is performed with respect to all the frame images, and all the local descriptors are analyzed in terms of their contributions.

3. Contribution of Local Descriptors to Object Recognition and their Characteristics

3.1. Positive Contribution and Characteristics

Figure 2:
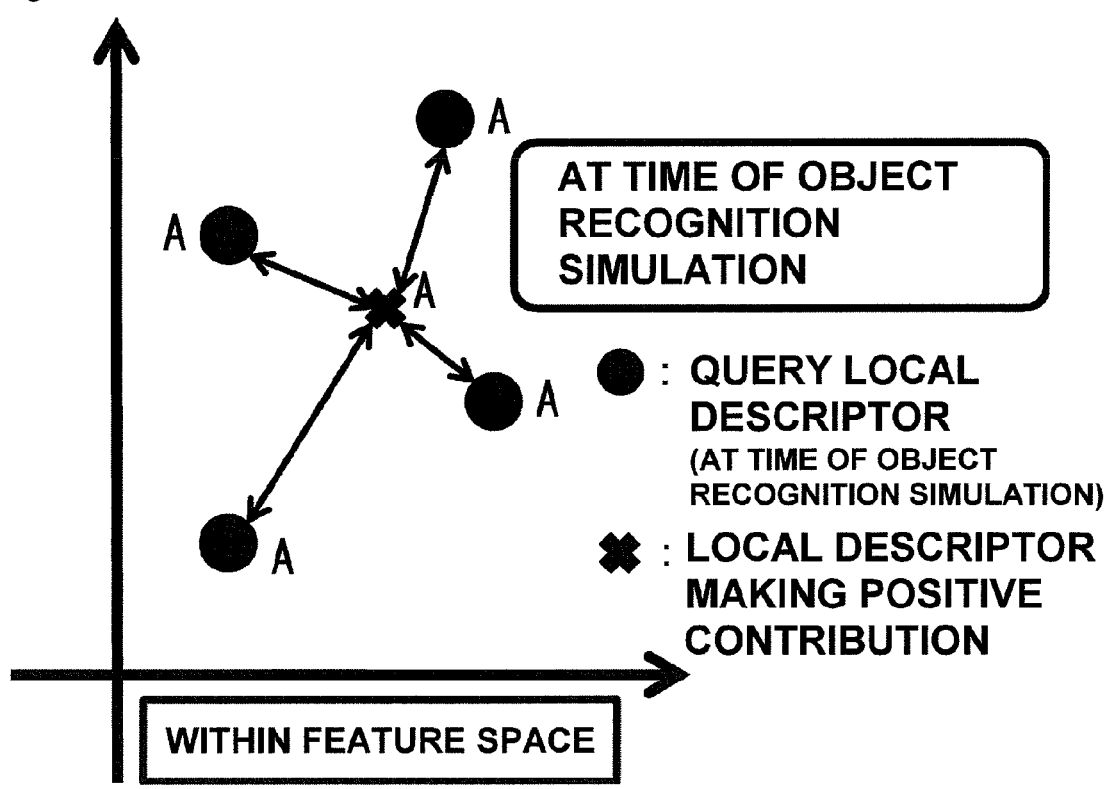
FIG. 2 is an explanatory diagram illustrating features of a local descriptor that makes positive contributions (nearest local descriptor to a plurality of local descriptors) according to the present invention.

The characteristics of local descriptors making positive contributions will be described. From the result of the object recognition simulation, among the local descriptors making positive contributions, there are such local descriptors that are each nearest to a plurality of local descriptors in a feature space, as shown in FIG. 2. When such local descriptors, among local descriptors, that can positively contribute to recognition of as many images as possible are stored in models, it is considered that a fewer number of local descriptors are required for recognition of a certain number of images.

That is, for recognition of n images, if one local descriptor that positively contributes to recognition of n images is stored, the number of local descriptors to be stored is fewer than if n local descriptors each of which positively contributes to recognition of one image is stored. Based on such an idea, in the object recognition simulation in this embodiment, the local descriptors that can positively contribute to recognition of more images are set as effective local descriptors for the objective achievement. Thus, in the present invention, how many images the local descriptor positively contributes to is set as a criterion for determining the effectiveness of a local descriptor making a positive contribution, and the number of the images is set as an evaluation value $E_1$. That is, the greater $E_1$ of a local descriptor is, the more images the local descriptor positively contributes to in the object recognition simulation. Thus, it can be said that such a local descriptor is effective for constructing a small memory model.

3.2. Negative Contribution and Characteristics

Local descriptors making negative contributions and their characteristics will be described. Nearest to a local descriptor making a negative contribution, local descriptors which are obtained from other objects are present. Thus, when such a local descriptor is stored in a model, it is considered that the local descriptor is highly likely to negatively contribute to recognition of unknown images. Based on such an idea, in this embodiment, local descriptors that can make negative contributions are considered to be ineffective for the objective achievement.

However, even among such local descriptors that can make negative contributions, there are some local descriptors that make positive contributions for certain images. Thus, not all the local descriptors that make negative contributions are ineffective for the objective achievement. For example, it will be assumed that there is a local descriptor that positively contributes to recognition of n images, and that negatively contributes recognition of one image. In this case, the number of local descriptors required for recognizing n images will be reduced if two local descriptors, i.e., the aforementioned local descriptor and a local descriptor that positively contributes to recognition of the image that the aforementioned local descriptor negatively contributes to are stored in a model, as compared to if n local descriptors each of which positively contributes to recognition of one image are stored in a model. Thus, in the present invention, for the sake of searching for effective local descriptors among the local descriptors that make negative contributions, how many images each local descriptor negatively contributes to for their recognition is used as the determination criterion, whereby the effectiveness of each local descriptor is obtained. The number of such images is set as an evaluation value $E_2$. That is, when the evaluation value $E_2$ of a local descriptor is smaller, it means that there are present fewer local descriptors that are obtained from other objects, nearest to the local descriptor. It is considered that such a local descriptor is less likely to cause erroneous recognition, and thus, the local descriptor is considered to be effective for the objective achievement.

4. Storage in Models

In order to construct small memory models which realize highly accurate object recognition, it is necessary to eliminate as many local descriptors making negative contributions as possible, and to search for combinations of effective local descriptors making positive contributions for the objective achievement. In this section, based on the contribution of the local descriptors and their effectiveness which are obtained from the result of the object recognition simulation, a technique of searching for combinations of local descriptors which realize the objective achievement will be described in detail. It is noted that, in this embodiment, each model is constructed based on the assumption that the following preconditions are satisfied. $E_1$ and $E_2$ are values obtained from the object recognition simulation when all local descriptors obtained from other frame images than a query image are stored in a model. However, when a certain local descriptor is not stored in a model, local descriptors that should positively or negatively contribute to the certain local descriptor will positively or negatively contribute to another local descriptor, and consequently the values $E_1$ and $E_2$ may vary. In this embodiment, it will be assumed as the precondition that such influence is small, and that the values of $E_1$ and $E_2$ will not vary.

4.1. Evaluation Criterion 1 for Storage

In this section, based on the contribution of the local descriptors and their effectiveness which are obtained from the result of the object recognition simulation, an evaluation criterion for their storage in models will be described specifically.

Through the object recognition simulation, the evaluation value $E_1$ which represents the effectiveness of each local descriptor making a positive contribution and the evaluation value $E_2$ which represents the effectiveness of each local descriptor making a negative contribution have been obtained. Here, a local descriptor that has a greater value of $E_1$ and a smaller value of $E_2$, is an more effective local descriptor for the objective achievement. Thus, in this embodiment, a value obtained from $E_1-E_2$ is set as an evaluation criterion for storing each local descriptor in a model, and local descriptors are stored in each model in decreasing order of their evaluation criteria.

4.2. Evaluation Criterion for Storage 2

In this embodiment, when local descriptors are stored in a model by using the value obtained from $E_1-E_2$ as the evaluation criterion, there may be local descriptors that have the same $E_1-E_2$ value. In this section, description will be made on an evaluation criterion for determining the order of such local descriptors to be stored in a model.

In this embodiment, in the object recognition simulation, distances between a local descriptor and its nearest local descriptors are calculated and saved. Based on the distance calculation, if a local descriptor having a correct object ID is close in distance to a query local descriptor, within a feature space, it is highly likely that the local descriptor gives a correct vote. In addition, if a local descriptor having a wrong object ID is far in distance from a query local descriptor, within the feature space, it is less likely that the local descriptor gives an erroneous vote. Accordingly, in this embodiment, with this distance information, the order of the local descriptors to be stored in a model will be determined, and description will be made thereon hereinafter in detail.

In the object simulation in this embodiment, when the object ID of a query local descriptor is the same as the object ID of a local descriptor that is nearest to the query local descriptor, the distance between the query local descriptor and the local descriptor is set as $D_1$. When the value of $D_1$ of a local descriptor is lower, it indicates that the local descriptor which has the same object ID as the query local descriptor, among such local descriptors having the same $E_1-E_2$ value, is present nearest to the query local descriptor. Thus, it is considered to be less likely that local descriptors obtained from unknown images of other objects are present nearer to the query local descriptor than the local descriptor that has been found to be the nearest to the query local descriptor. In addition, the distance between a query local descriptor and a local descriptor that is nearest to the query local descriptor, among those local descriptors having object IDs different from that of the query local descriptor, is set as $D_2$. When the value of $D_2$ is greater, it indicates that fewer local descriptors having other object IDs are present nearest to the query local descriptor. Thus, it is considered to be highly likely that a local descriptor obtained from an unknown image of the same object is present nearest to the query local descriptor as compared to local descriptors having other object IDs. Accordingly, in this embodiment, $D_1$ and $D_2$ are used for the following expression.

$$E_3 = \frac{D_2}{D_1} \quad \text{[Expression 1]}$$

The above expression is set as an evaluation criterion for storing each local descriptor, and if local descriptors have the same $E_1-E_2$ value, the local descriptors are stored in a model in decreasing order of their values $E_3$. The following three points should be taken into account when the value of $E_3$ is to be obtained.

Firstly, since points of local descriptors that are nearest to a query local descriptor are obtained approximately by using a hash function, there may be a case where no local descriptor having another object ID is present nearest to the query local descriptor. It is considered that such a local descriptor is less likely to cause erroneous recognition when it is stored in a model. Accordingly, in such a case, the value of $D_2$ is set as $\infty$.

Secondly, there may be a case where the object ID of a query local descriptor is different from that of a local descriptor nearest to the query local descriptor. It is considered that such a local descriptor is highly likely to cause erroneous recognition when it is stored in a model. Accordingly, in such a case, $E_3=0$ is set. Thirdly, there may be a case where no local descriptor can be found to be nearest to a query local descriptor. This means that local descriptors do not contribute to recognition of any image in a huge number of frame images. Thus, such local descriptors are considered to be less likely to affect the recognition rate. Accordingly, in such a case, $E_3=0$ is set.

4.3. Technique of Storage in Models

In the object recognition system used in this embodiment, correspondence between local descriptors obtained from a query image and local descriptors stored in models is analyzed, and when a correspondence is found between a local descriptor and its corresponding query local descriptor, a vote is cast for an object including the local descriptor. An object having obtained the largest number of votes is regarded as a recognition result. That is, such an object that has obtained even a slightly larger number of votes than other objects can be regarded as the recognition result. Thus, it is necessary to search for a combination of as few number of local descriptors as possible so as to allow a correct answer object to obtain the largest number of votes, no matter what image is used as the query image. In the present invention, by using the above-mentioned evaluation criteria for storing local descriptors in each model, a technique of greedily obtaining a combination of local descriptors will be proposed. Description will be made thereon hereinafter specifically.

In order to correctly recognize an image, no matter what image is used as the query image, it is considered to be necessary to correctly recognize at least all frame images. Local descriptors that positively contribute to the frame images have been obtained in the object recognition simulation. Based on the information, in this embodiment, each model is constructed so that all the frame images can be recognized correctly. Accordingly, image tables are prepared for respective objects so as to clearly show the relation between a certain local descriptor stored in a model and its contribution to recognition of a certain frame image.

$$X=(X_1, \ldots, X_N) \quad \text{[Expression 2]}$$

Here, N is the number of images used for constructing a model of an object, and image tables X indicate how many correct votes can be cast based on models currently stored when an image having an ID Ij is given as a query. In this case, each time a local descriptor is stored in a model, one vote is cast for a frame image to which the local descriptor positively contributes in the object recognition simulation. In addition, if a local descriptor having been stored makes a negative contribution, one vote that has been wrongly cast for an object image in the object recognition simulation is decremented from the image table of the object image. This means that when one vote is decremented from an image, for the sake of correct recognition of the image, it is necessary to store local descriptors in a model so that the image can obtain two or more votes for correct recognition. Thus, in this embodiment, a minimum vote number s in an image table is defined as s=1. Each time a local descriptor has been stored in a model, as to the remaining local descriptors yet to be stored, the number of those images whose values in their image tables are less than s at that time, among the images to which the remaining local descriptors can positively contribute, is set as a new evaluation value $E'_1$, and the remaining local descriptors are stored in the model greedily in decreasing order of their values of $E'_1-E_2$.

Figure 3:
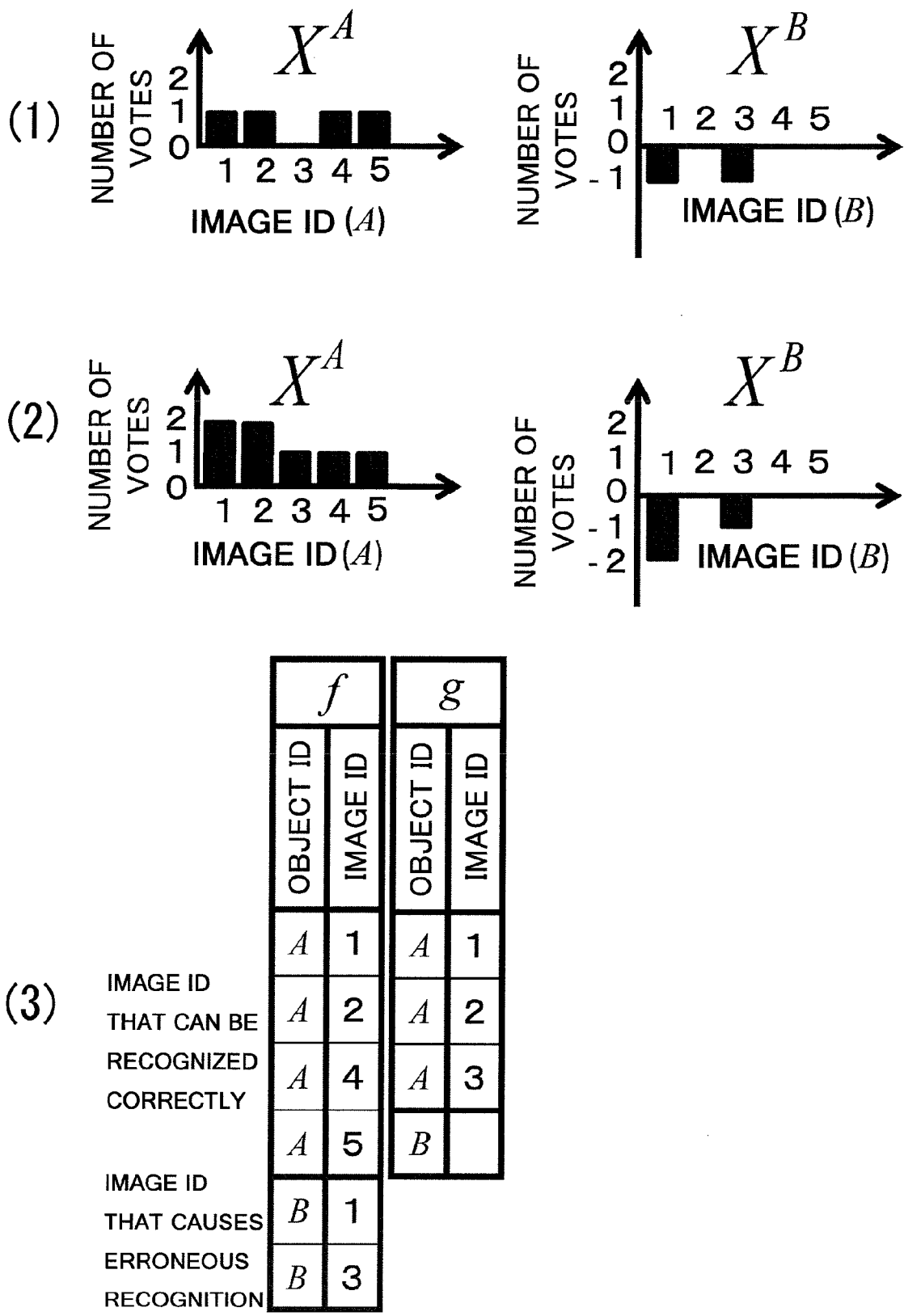
FIG. 3 is an explanatory diagram illustrating an example of a technique of greedily choosing feature points according to this embodiment.

Specific examples will be shown in FIG. 3. A local descriptor f extracted from an object A is a local descriptor that positively contributes to images having image IDs 1, 2, 4, and 5 of the object A in the object recognition simulation, and negatively contributes to images having image IDs 1 and 3 of an object B. If the local descriptor f is stored in a model, as shown in FIG. 3(a), votes are cast in an image table $X^A$ of the object A, and votes are decremented in an image table $X^B$ of the object B. Next, a local descriptor g extracted from the object A is a local descriptor that positively contributes to images having image IDs 1, 2, and 3 of the object A, and negatively contributes to an image having an image ID 1 of the object B in the object recognition simulation. Here, among the image IDs to which the local descriptor g can positively contribute, the image ID 3 of the object A is the only the image ID that has not been positively contributed to, according to a model currently being constructed. Therefore, the new evaluation value $E'_1$ of the local descriptor g satisfies $E'_1=1$. Here, if the local descriptor g is subsequently stored in the model, the image tables will be as shown in FIG. 3(b).

In this embodiment, a threshold t is set for the total number of local descriptors to be stored in a model, and when all the values in each image table reach s or more, if the number of local descriptors stored in the model is less than t, the minimum vote number s in the image table is incremented by one for stable object recognition, and local descriptors are stored in decreasing order of their value of $E'_1-E_2$, such that all the values in the image table will be s or more. The above processing is repeated until the number of local descriptors stored in the model reaches t.

Flow Chart and Block Diagram

Figure 8:
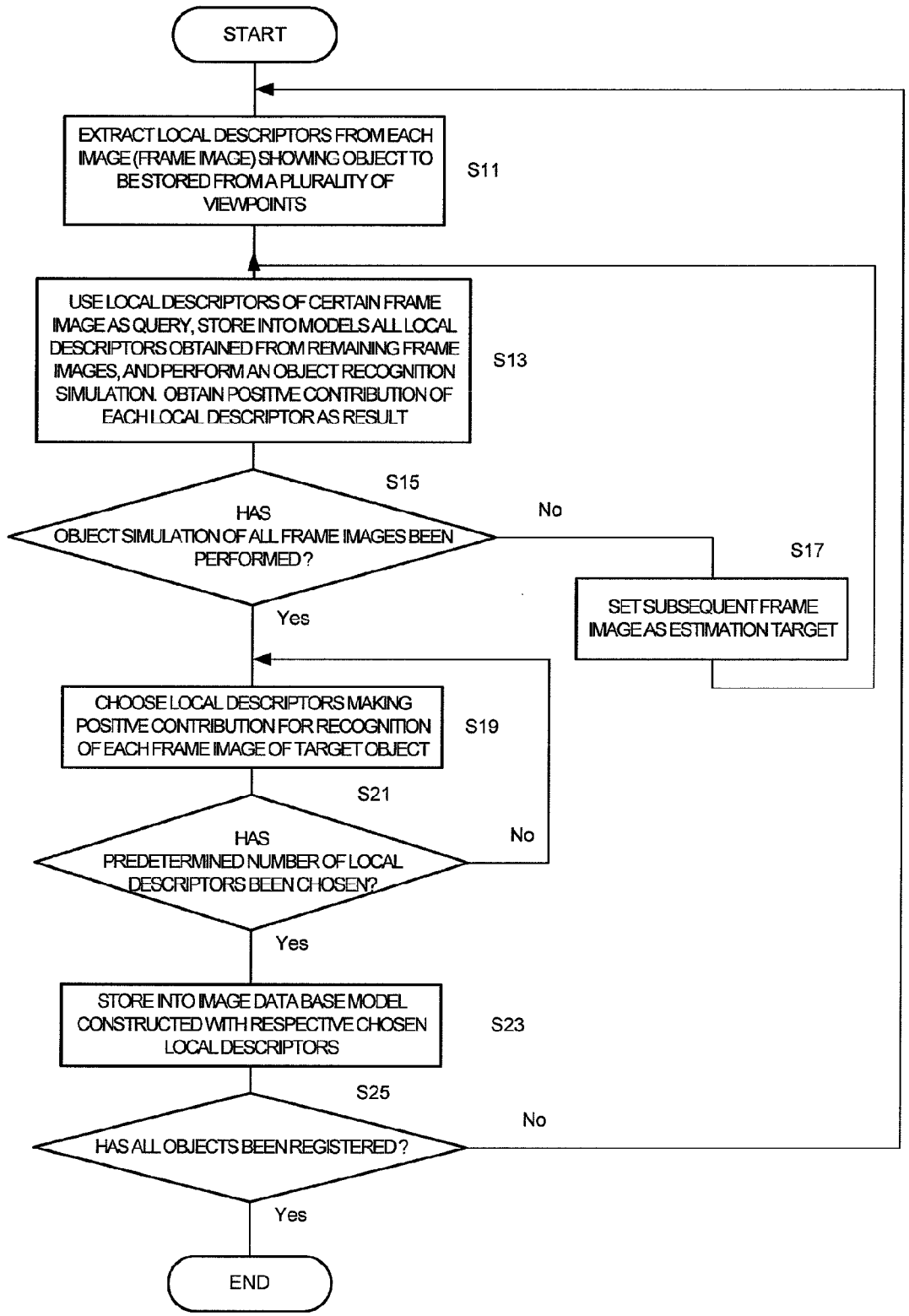
FIG. 8 is a flowchart showing a procedure for storing images in an image database used for three-dimensional object recognition, according to this embodiment.

FIG. 8 is a flowchart showing a procedure of storing images in a three-dimensional object recognition image database, according to this embodiment. As shown in FIG. 8, when frame images showing an object to be stored from a plurality of viewpoints are inputted to a computer performing processing, the computer extracts local descriptors from the frame images showing the object (step S11). Next, local descriptors in a certain frame image are used as a query, and local descriptors obtained from the other frame images are stored in models, and then object recognition simulation is performed. As a result of the object recognition simulation, scores are obtained with respect to the local descriptors making positive contributions. Scores have been obtained with respect to the local descriptors in the same frame image (step S13). Next, whether or not scores are obtained with respect to all the frame images showing the object to be stored is determined (step S15). When there are any frame images yet to be processed (No in step S15), the above step S13 of the object recognition simulation is repeated with respect to the subsequent frame images or frame images of other objects (step S17).

When the object recognition simulation is completed with respect to all the frame images (Yes in step S 15), local descriptors that highly positively contribute to recognition of each frame image of the target object are chosen (step S19). A specific example of a procedure of choosing such local descriptors is as per the above description made with reference to FIG. 3. Choice of local descriptors is repeated until a predetermined number of local descriptors (t local descriptors according to the description with reference to FIG. 3) have been chosen for the target object (step S21). The chosen local descriptors are stored into an image database for constructing a model according to the target object (step S23). Next, whether or not there are any objects yet to be stored is checked (step S25), and in the case where there are any other objects yet to be stored (No in step S25), the routine returns to step S11 and the processing is repeated. When storage of models according to all the objects is completed, (Yes in step S25), the storage processing into the image database ends.

Figure 9:
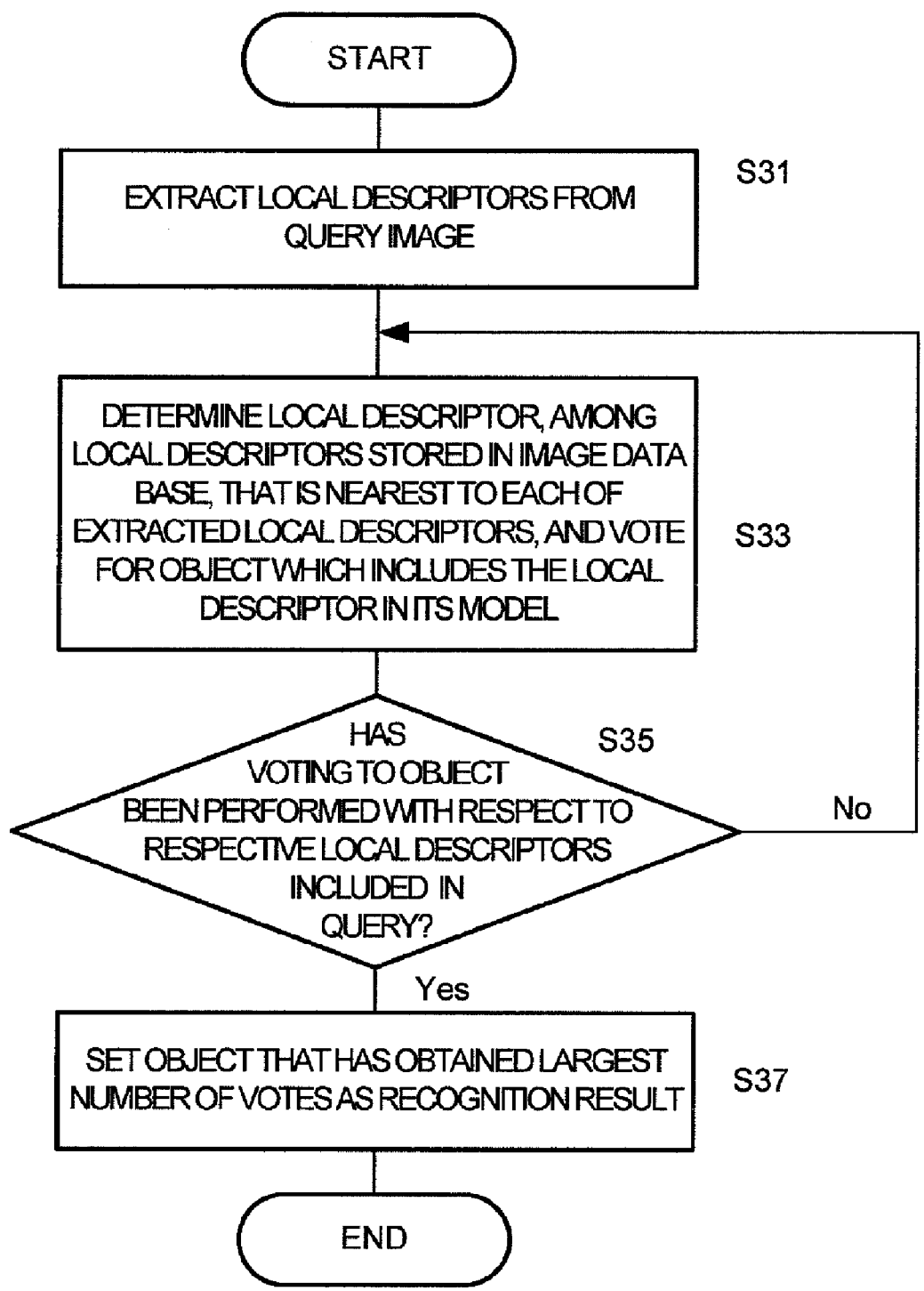
FIG. 9 is a flowchart showing a procedure to be performed for object recognition (retrieval) using the image database where images are stored based on the procedure shown in FIG. 8.

FIG. 9 is a flowchart showing a procedure of recognition (retrieval) using, as the target, the image database in which images are stored based on the procedure shown in FIG. 8. As shown in FIG. 9, when an image is inputted as a query, a computer performing processing extracts local descriptors from the query (step S31). Next, a local descriptor nearest to each of the extracted local descriptors is determined from among the local descriptors stored in the image database. A vote is cast for an object including the determined local descriptor in its model (step S33). Next, with respect to each of the local descriptors included in the query, whether or not a vote has been cast for an object that is obtained as a result of nearest neighbor searching is judged (step S35).

With respect to each of the local descriptors included in the query, the voting processing in above step S33 is performed. When voting is completed with respect to all the local descriptors (Yes in step S35), an object that has obtained the largest number of votes is outputted as a recognition result (step S37).

Next, a configuration of a processing apparatus which processes an image database used for a three-dimensional object recognition according to the present invention will be described.

Figure 10:
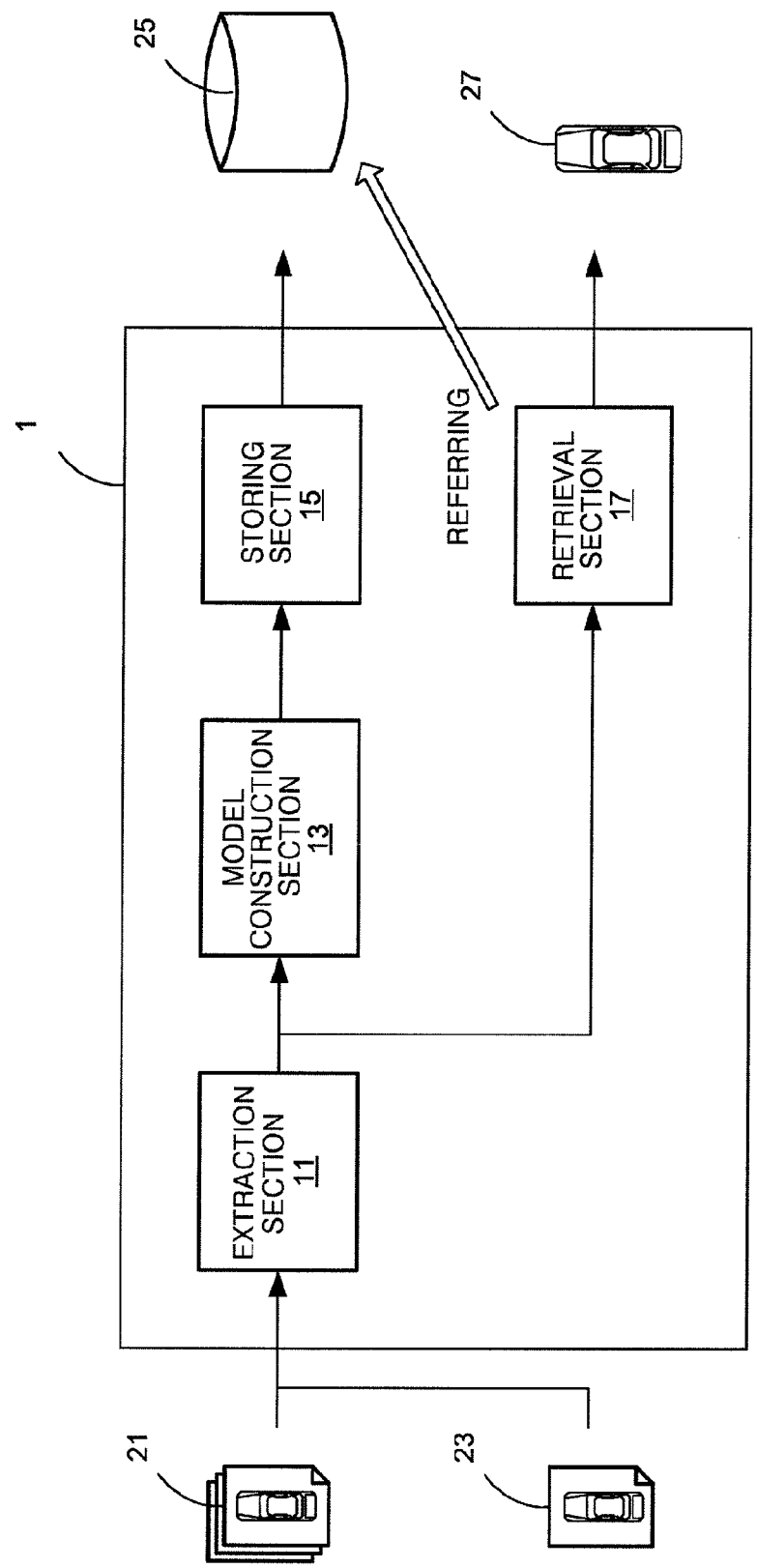
FIG. 10 is a block diagram illustrating a functional configuration of an apparatus for processing the image database used for three-dimensional object recognition according to the present invention.

FIG. 10 is a block diagram illustrating a functional configuration of the processing apparatus which processes an image database used for a three-dimensional object recognition according to the present invention. In FIG. 10, to store a model of a three-dimensional object in an image database 25, a plurality of frame images 21 representing the object to be stored are given as inputs to a processing apparatus 1. A model according to a target object is outputted and stored in the image database 25. On the other hand, to retrieve an object according to a model stored in the image database 25, a query 23 is given as an input to the processing apparatus 1. The processing apparatus 1 refers to the image database 25 to output information to specify the object stored in the image database 25.

An extraction section 11 extracts feature vectors from the inputted frame images 21 or the inputted query 23. A model construction section 13 chooses, through an object recognition simulation, local descriptors that are effective for image recognition from among the local descriptors extracted from the frame images, organizes the chosen local descriptors so as to be adapted to be used for nearest neighbor searching, and constructs a model according to the target object. A storing section 15 stores the constructed model in the image database. When the query 23 is inputted, a retrieval section 17 determines, through the nearest neighbor search processing, a local descriptor that is nearest to each of the local descriptors extracted from the query 23 from among the local descriptors stored in the image database 25. The retrieval section 17 casts a vote for an image including the determined local descriptor, and specifies an object from among objects stored in the image database 25, based on a result of the voting performed with respect to each local descriptor included in the query. The retrieval section 17 outputs identification information of the specified object 27 as a recognition result.

A computer and a memory are mainly used as hardware realizing the functions of the extraction section 11, the model construction section 13, the storing section 15, and the retrieval section 17 shown in FIG. 10. That is, when a computer executes a processing program which processes an image database used for a predetermined object recognition, the function of each section is executed.

Experiments

Figures 4, 5:
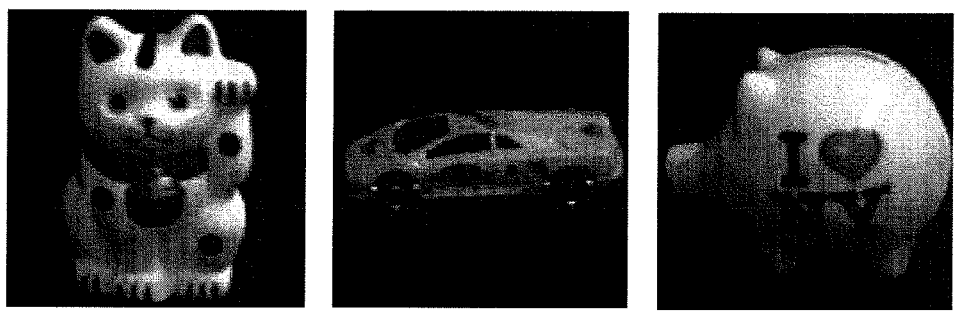
FIG. 4 is an explanatory diagram showing the number of frame images and the average number of local descriptors extracted per frame image according to an experiment of this embodiment.
FIG. 5 is a diagram illustrating examples of frame images from an image database COIL-100, which are used in an experiment of this embodiment.

The experiments were performed using 11 objects shown in FIG. 4, and COIL-100.

First, a data set used for an experiment performed with respect to the 11 objects will be described. In this experiment, three-dimensional objects were rotated by 360 degrees; a video of each of the objects was shot with a Hi-Vision video camera (manufactured by Sony Corporation, model number: HDR-HC1, resolution: 740480); and all frame images obtained thereby were used for model construction. The number of the frame images was 13086 in total, and the number of local descriptors obtained was about 2.5 million, and the memory size of all the models was 191.3 MB. FIG. 4 shows the used objects, the number of frame images used for constructing a model of each object, and the average number of local descriptors extracted per frame image. Query images were prepared by placing the three-dimensional objects in a lighting condition different from that when the objects were shot for the images for model construction, and by taking the objects at every 10 degrees of rotation. Accordingly, 36 images were obtained per object.

Next, an experiment using the COIL-100 will be described. The COIL is an image database including images of 100 objects each shot at every 5 degrees of rotation. In this experiment, among 72 images which were obtained by shooting each object at every 5 degrees of rotation, 36 images which were obtained by shooting the object at angles of 0 degrees, 10 degrees, 20 degrees, . . . , and 350 degrees were used for model construction. As query images, 36 images were prepared per object by shooting the object at angles of 5 degrees, 15 degrees, 25 degrees, . . . , and 355 degrees. The number of local descriptors obtained from all the images for model construction was about 180,000, and the memory size of all the models constructed was 13.6 MB. FIG. 5 illustrates examples of the used frame images.

For both experiments, the technique by Noguchi et al. was used as the three-dimensional object recognition technique. The same parameters were used in the object recognition simulation according to this embodiment and in the experiments.

In the experiments, models constructed using this embodiment, and models chosen at random from all the local descriptors were used, and the recognition rates were compared. For the random technique, 10 kinds of models were constructed.

Figure 6:
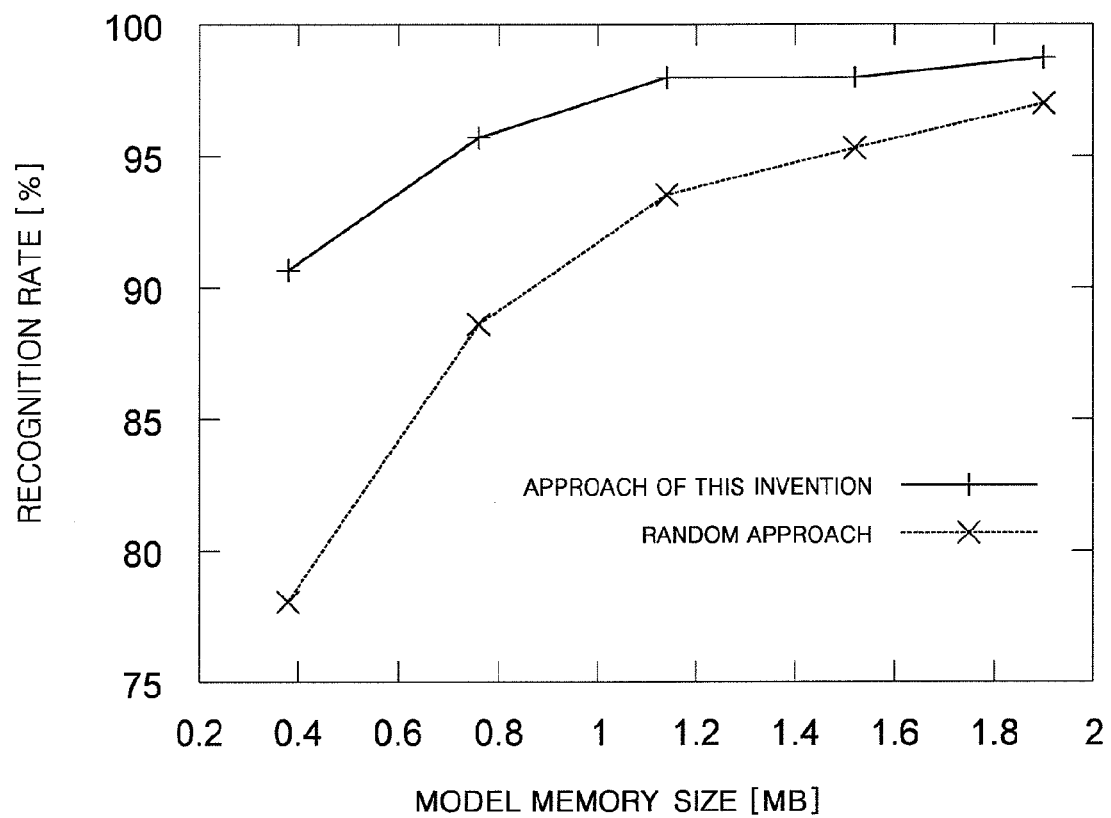
FIG. 6 is a graph showing a first experimental result according to this embodiment (a graph showing the recognition result of 11 objects shown in FIG. 4).

FIG. 6 indicates a result of the experiment performed using the 11 objects. It is noted that the random technique indicates an average recognition rate of the 10 models. From the experimental result, it is understood that this embodiment was more effective than the models chosen at random when the memory size of the models was smaller. Here, the result of models in the case of t=25,000, which obtained the highest recognition rate of 98.73%, will be focused on. In the models, a "doll 2" and a "wrist watch" each had one image causing erroneous recognition, and a "doll 6" had three images causing erroneous recognitions. The images having caused the erroneous recognition were erroneously recognized because objects other than correct objects obtained a larger number of votes, or because correct objects had not obtained any vote. The problem that an object other than the correct object obtains a larger number of votes is considered to occur because nearest local descriptors to the stored local descriptors may change between a state where any local descriptor is yet to be eliminated and a state after choice of local descriptors.

Figure 7:
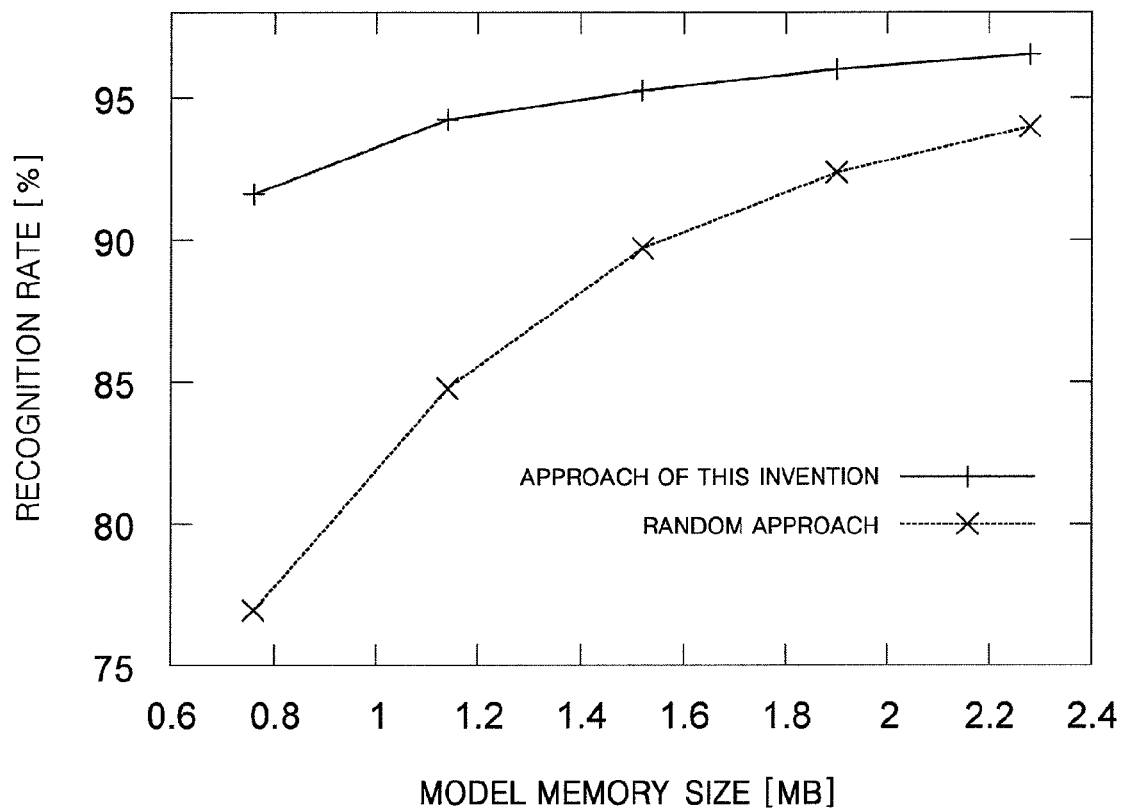
FIG. 7 is a graph showing a second experimental result according to this embodiment (a graph showing recognition result of COIL-100).

Next, FIG. 7 indicates a result of the experiment performed using the COIL-100. It is noted that the random technique indicates an average recognition rate of 10 models. Here, the result of models in the case of t=25,000 which obtained the recognition rate of 96% will be focused on. In the models, an "obj15" obtained the lowest recognition rate. Among the images of the "obj15" having caused the erroneous recognition, five images caused erroneous recognition because other objects obtained a larger number of votes, and one image caused erroneous recognition because no vote was cast for the correct object. As one of the reasons why the erroneous recognitions were caused, the number of local descriptors obtained from the images can be considered. That is, the number of local descriptors obtained from each image was fewer. Thus, it may be necessary to set an evaluation criterion which allows many local descriptors to be stored in a model, even for an object from which only a few number of local descriptors are obtainable.

Accordingly, described in this embodiment and the experiments is the technique of reducing the memory in the three-dimensional object recognition using local descriptors by choosing local descriptors so that an object can be recognized highly accurately with as few a local descriptors as possible. As a result of the experiment using 11 objects as the targets, the recognition rate of 98.73% was obtained with the models whose memory size was reduced to one-hundredth.

In addition, as a result of the experiment using the COIL-100 as the targets, the recognition rate of 96% was obtained with the models whose memory size was reduced to about one-seventh.

Various modifications of the present invention may be attained other than the above mentioned embodiment. Such modifications should not be deemed to be out of the scope of the present invention. The present invention should include all the modifications within the scope of the claims, their equivalents, and within the above scope.

DESCRIPTION OF THE REFERENCE CHARACTERS

1: processing apparatus
11: extraction section
13: model construction section
15: storing section
17: retrieval section
21: frame image representing an object to be stored
23: query image
25: image database
27: recognition result

The invention claimed is:

1. A method for compiling an image database that is used for a three-dimensional object recognition comprising the steps of:
    extracting, from a plurality of images each image showing a three-dimensional object from different viewpoint, a plurality of local descriptors each of which is a vector representing respective local features of each image;
    constructing an object model of the three-dimensional object, the object model being obtained by estimating contribution of each vector to the three-dimensional object recognition, by choosing the vectors making positive contribution and by organizing the chosen vectors in such a manner that each vector is adapted to be used for approximate nearest neighbor searching; and
    storing into the image database the images showing the three-dimensional object and the constructed object model with an object ID for identifying the three-dimensional object being attached, wherein: each of the steps is executed by a computer;
    the storing step stores the object model and the corresponding object ID so that, when an image showing a three-dimensional object in question is given as a query while a plurality of object models are stored in the image database, the computer extracts a plurality of query local descriptors from the query through a similar step to the extracting step, retrieves vectors as neighbor vectors of each query local descriptor, each neighbor vector being retrieved from the stored object models in the image database by using an algorithm of the approximate nearest neighbor searching, obtains object IDs attached to the neighbor vectors, determines at least one three-dimensional object which is identified by the object IDs as a candidate and determines at least one three-dimensional object based on points of similarities and/or of differences between each query local descriptor and corresponding neighbor vector; and
    the object model construction step estimates the contribution of each vector in such a manner that when a vector extracted from an image of a three-dimensional object is approximately nearest to another vector according to the same three-dimensional object from a different viewpoint, the vector is regarded to make a positive contribution, and when the vector is approximately nearest to another vector according to a different three-dimensional object, the vector is regarded to make a negative contribution.

2. The method according to claim 1, wherein
the model construction step constructs the object model through the steps of:
    specifying an approximate nearest vector to a target vector to be estimated, the approximate nearest vector being retrieved from vectors extracted from images showing from the different viewpoints the same three-dimensional object according to the target vector and from images of different three-dimensional objects;
    counting up a score in the case where the approximate nearest vector is derived from the same three-dimensional object according to the target vector; and
    choosing the vectors that construct the object model based on scores counted in the counting steps for each vector.

3. The method according to claim 2, wherein
the model construction step scores each vector extracted from each image showing the three-dimensional object to be stored from the different viewpoints.

4. The method according to claim 3, wherein
the model construction step chooses the vectors so that the vectors extracted from the images of the same three-dimensional object from different viewpoints are shared almost evenly in the object model.

5. The method according to claim 3, wherein
the model construction step estimates the contribution of each vector to the recognition of a three-dimensional instance.

6. The method according to claim 2, wherein
the model construction step chooses the vectors so that the vectors extracted from the images of the same three-dimensional object from different viewpoints are shared almost evenly in the object model.

7. The method according to claim 6, wherein
the model construction step estimates the contribution of each vector to the recognition of a three-dimensional instance.

8. The method according to claim 2, wherein
the model construction step estimates the contribution of each vector to the recognition of a three-dimensional instance.

9. The method according to claim 1, wherein
the model construction step estimates the contribution of each vector to the recognition of a three-dimensional instance.

10. An apparatus for processing an image database that is used for a three-dimensional object recognition comprising:
an extraction section which extracts, from a plurality of images each image showing a three-dimensional object from different viewpoint, a plurality of local descriptors each of which is a vector representing respective local features of each image;
a model construction section which constructs an object model of the three-dimensional object, the object model being obtained by estimating contribution of each vector to the three-dimensional object recognition, by choosing the vectors making positive contribution and by organizing the chosen vectors in such a manner that each vector is adapted to be used for approximate nearest neighbor searching;
a storing section which stores into the image database the images showing the three-dimensional object and the constructed object model with an object ID for identifying the three-dimensional object being attached; and
a retrieval section which, when an image showing a three-dimensional object in question is given as a query while a plurality of object models are stored in the image database extracts a plurality of query local descriptors from the query in a similar manner as in the extraction section; retrieves vectors as neighbor vectors of each query local descriptor, each neighbor vector being retrieved from the stored object models in the image database by using an algorithm of the approximate nearest neighbor searching, obtains object IDs attached to the neighbor vectors, determines at least one three-dimensional object which is identified by the object IDs as a candidate, and determines at least one three-dimensional object based on points of similarities and/or of differences between each query local descriptor and corresponding neighbor vector, wherein the object model construction section estimates the contribution of each vector in such a manner that when a vector extracted from an image of a three-dimensional object is approximately nearest to another vector according to the same three-dimensional object from a different viewpoint, the vector is regarded to make a positive contribution, and when the vector is approximately nearest to another vector according to a different three-dimensional object, the vector is regarded to make a negative contribution.

11. A non-transitory computer readable medium having a program for processing an image database that is used for a three-dimensional object recognition, the program causing a computer to function as:
an extraction section which extracts, from a plurality of images each image showing a three-dimensional object from different viewpoint, a plurality of local descriptors each of which is a vector representing respective local features of each image;
a model construction section which constructs an object model of the three-dimensional object, the object model being obtained by estimating contribution of each vector to the three-dimensional object recognition, by choosing the vectors making positive contribution and by organizing the chosen vectors in such a manner that each vector is adapted to be used for approximate nearest neighbor searching;
a storing section which stores into the image database the images showing the three-dimensional object and the constructed object model with an object ID for identifying the three-dimensional object being attached; and
a retrieval section which, when an image showing a three-dimensional object in question is given as a query while a plurality of object models are stored in the image database: extracts a plurality of query local descriptors from the query in a similar manner as in the extraction section, retrieves vectors as neighbor vectors of each query local descriptor, each neighbor vector being retrieved from the stored object models in the image database by using an algorithm of the approximate nearest neighbor searching; obtains object IDs attached to the neighbor vectors; determines at least one three-dimensional object which is identified by the object IDs as a candidate; and determines at least one three-dimensional object based on points of similarities and/or of differences between each query local descriptor and corresponding neighbor vector,
wherein the object model construction step estimates the contribution of each vector in such a manner that when a vector extracted from an image of a three-dimensional object is approximately nearest to another vector according to the same three-dimensional object from a different viewpoint, the vector is regarded to make a positive contribution, and when the vector is approximately nearest to another vector according to a different three-dimensional object, the vector is regarded to make a negative contribution.

* * * * *